United States Patent
Flynn

[15] 3,666,964
[45] May 30, 1972

[54] ENERGY STORAGE AND DISCHARGE SYSTEM

[72] Inventor: Joseph E. Flynn, San Diego, Calif.
[73] Assignee: Subsea Products, Inc., San Diego, Calif.
[22] Filed: Nov. 27, 1970
[21] Appl. No.: 93,101

[52] U.S. Cl............................307/108, 307/109, 315/240, 315/241, 320/1
[51] Int. Cl...................................H05b 41/32, H05b 41/38
[58] Field of Search..................315/173, 240, 241; 313/201; 320/1; 307/109, 110, 106, 108

[56] References Cited

UNITED STATES PATENTS

| | | | |
|---|---|---|---|
| 3,543,125 | 11/1970 | Lawhead | 320/1 |
| 2,894,174 | 7/1959 | Schankler | 315/241 X |
| 2,913,631 | 11/1959 | Cuker | 313/201 X |
| 3,244,167 | 4/1966 | Ferris et al. | 315/241 X |
| 3,267,328 | 8/1966 | Girard | 315/173 X |
| 3,316,450 | 4/1967 | Troubetzkoi | 315/241 X |
| 3,515,938 | 6/1970 | Morse | 315/173 X |

Primary Examiner—H. O. Jones
Assistant Examiner—William J. Smith
Attorney—Smyth, Roston & Pavitt

[57] ABSTRACT

This system is for charging a plurality of capacitors connected in parallel. Only individual ones of the capacitors are discharged in accordance with the setting of a multi-position switch. Unidirectional members are included in the circuit for providing for the charging of all of the capacitors but the discharging of only the selected capacitors. When the capacitors discharge, they may trigger a flashtube which provides the light to take a photograph.

13 Claims, 1 Drawing Figure

Patented May 30, 1972 3,666,964
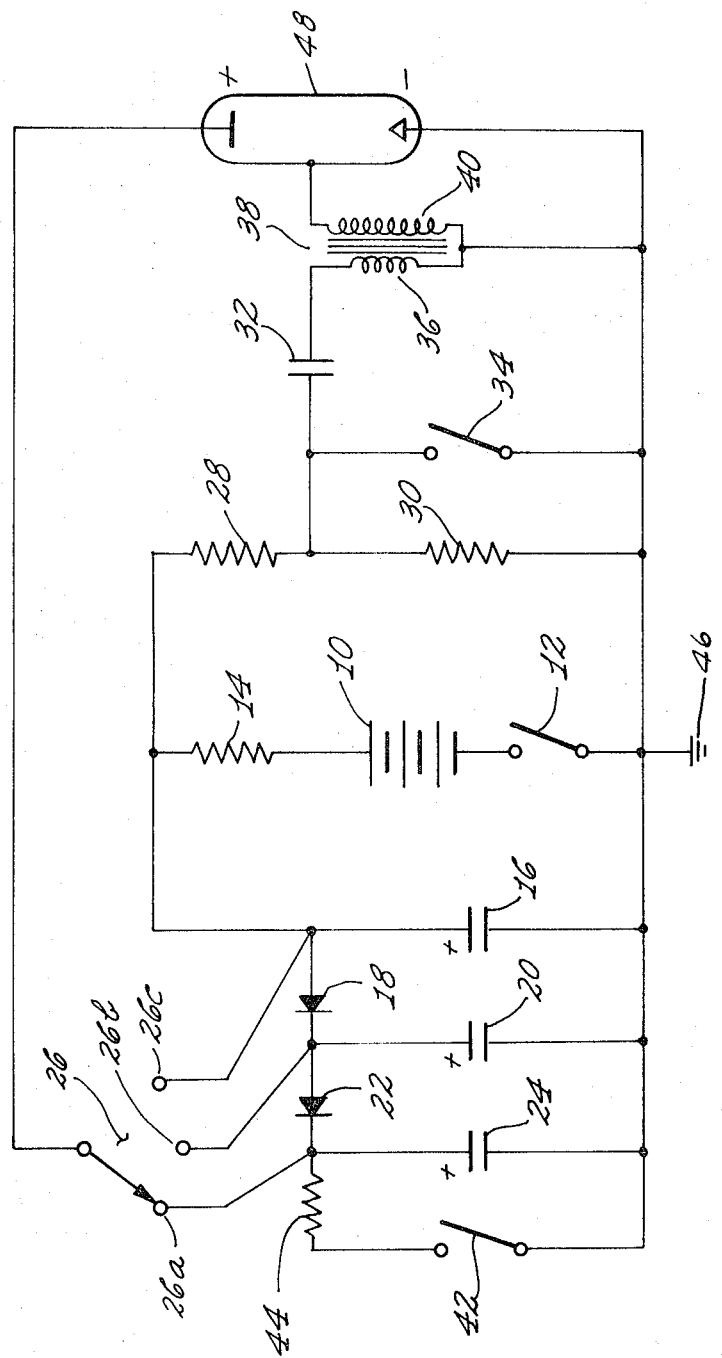
INVENTOR:
Joseph E. Flynn
By Smyth, Roston & Pavitt
ATTORNEYS

ENERGY STORAGE AND DISCHARGE SYSTEM

This invention relates to a system for providing a controlled discharge of energy-storage members such as capacitors. More particularly, the invention relates to a system for providing a charging of a plurality of capacitors and for providing a controlled discharge of one or more of the capacitors on a selected basis. The invention is particularly adapted to be used in connection with a camera for illuminating the field of view when a picture is to be taken by the camera.

At different times a photographer wishes to illuminate a field of view of a camera with a different amount of light. This is particularly true when the photographer wishes quality pictures to be taken of the image in the field of view. Various attempts have been made in the prior art to control the amount of light provided in the field of view at the time that a picture is taken by a camera. However, these attempts have not been entirely successful.

This invention provides a system for controlling the amount of light which can be provided to a field of view when a picture is to be taken by a camera, and particularly an underwater camera. The invention includes at least a pair of capacitors which are charged by an energy source. A switch is included in the system for selectively controlling whether only a single one of the capacitors or more than one of the capacitors is discharged through a flashtube for the camera. Unidirectional members are also included in the circuit for providing for the charging of all of the capacitors but for preventing individual ones of the capacitors from discharging in accordance with the setting of the switch. The unidirectional members may be connected in a series relationship with an associated capacitor and in a parallel relationship with a preceding capacitor.

The single FIGURE is a circuit diagram illustrating one embodiment of the invention.

In the single FIGURE a source of electrical energy such as a battery 10 is provided. The battery 10 may be adapted to provide 500 volts. A normally open switch 12 is in series with the battery 10 and one terminal of the switch 12 is connected to a suitable reference potential such as ground 46. A resistor 14 having a suitable value such as approximately 12,000 ohms and a capacitor 16 having a suitable value such as 400 microfarads are connected in series with the battery 10 and the switch 12, with one terminal of the capacitor 16 being connected to the reference potential such as ground 46.

The anode of a unidirectional member such as a diode 18 is connected to the terminal common to the resistor 14 and the capacitor 16, and the cathode of the diode 18 is connected to one terminal of a capacitor 20, the other terminal of which is connected to the reference potential such as ground. The diode 18 may be an MR1035B manufactured by Motorola and the capacitor 20 may have a value of 400 microfarads. Similarly, the anode of a diode 22 is connected to the cathode of the diode 18 and the cathode of the diode 22 is connected to one terminal of a capacitor 24, the other terminal of which is connected to the reference potential such as ground. The diode 22 may be an MR1035B and the capacitor 24 may have a value of 400 microfarads. It will be appreciated that the capacitors 16, 20, 24 may be electrolytic capacitors each having a positive terminal and a negative terminal wherein the negative terminals are connected to the reference potential such as ground 46. A resistor 44 and a switch 42 are in series across the capacitor 24.

Stationary contacts 26c, 26b and 26a are respectively connected to the ungrounded terminals of the capacitors 16, 20 and 24. The stationary contacts 26a, 26b and 26c are included in a switch 26 with a movable arm. The stationary contact 26c is connected to a voltage divider network formed by a pair of series resistances 28 and 30, one terminal of the resistor 30 being connected to the reference potential such as ground. The resistances 28 and 30 may respectively have values of 1 and 3.9 megohms. A normally open switch 34 is connected across the resistance 30.

A capacitance 32 having a suitable value such as 0.025 microfarads and a primary winding 36 of a transformer 38 generally indicated at 38 are in series across the switch 34. One terminal of a secondary winding 40 in the transformer 38 is connected to the reference potential such as ground and the other terminal of the secondary winding 40 is connected to a trigger of a flashtube 48. The flashtube is preferably filled with Xenon and may be a type FT118. The anode of the flashtube 42 is connected to the movable arm of the switch 26 and the cathode of the flashtube is connected to the reference potential such as ground.

When the switch 12 is closed, current flows through a circuit including the battery 10, the resistor 14, the capacitor 16 and the switch 12 to charge the capacitor 16. Since the diode 18 has a relatively low impedance in the direction of current flow from the battery 10, the capacitor 20 is also charged with approximately the same charge as the capacitor 16. The capacitor 24 is also provided with approximately the same charge as the capacitor 16 since the diode 22 is forward biased.

The discharge of the capacitors 16, 20 and 24 is dependent upon the setting of the movable arm of the switch 26. For example, when the movable arm of the switch 26 engages the stationary contact 26c the capacitor 16 is able to discharge through a circuit including the capacitor 16, the switch 26 and the flashtube 48 when the flashtube is triggered.

With the movable arm of the switch 26 engaging the stationary contact 26c, the capacitors 20 and 24 are not able to discharge through the switch 26 since the diodes 18 and 22 provide a high impedance in the reverse direction. When the movable arm of the switch 26 is moved to engage the stationary contact 26b, the capacitor 20 discharges directly through a circuit including the capacitor 20, the switch 26 and the flashtube 48 when the flashtube is fired. The capacitor 16 is also able to discharge through this circuit since the diode 18 is forward biased. However, the capacitor 24 is still not able to discharge through this circuit since the diode 22 is reverse biased. Since the capacitors 16 and 20 are able to discharge into the flashtube 48 with the movable arm of the switch 26 engaging the stationary contact 26b, the flashtube 48 receives twice as much energy as when only the capacitor 16 is able to be discharged.

When the movable arm of the switch 26 engages the contact 26a, as illustrated in the drawing, all of the capacitors 16, 20 and 24 are discharged through the circuit including the flashtube 48 when the flashtube is triggered. This means that the flashtube 48 receives three times as much energy as when only the capacitor 16 is able to discharge through the switch.

The triggering of the flashtube is dependent upon the closure of the switch 34. Before the closing of the switch 34, the capacitor 32 is charged by the battery 10 when the switch 12 is closed. Upon the closure of the switch 34, the capacitor 32 discharges through the primary winding 36 of the transformer 38. The secondary winding 40 is provided with a greater number of turns than the primary winding 36 so that the voltage pulse produced across the primary winding is amplified. Preferably, a voltage pulse of approximately 8,000 volts may be produced across the secondary winding 40.

The voltage pulse across the secondary winding 40 is introduced to the trigger of the flashtube 48. This operates the flashtube 48 so that a flash of light is produced in the tube by the discharge of selected ones of the capacitors 16, 20 and 24. This flash of light may be synchronized with the operation of the associated camera to illuminate the field of view of the camera at the time that a picture is being taken by the camera. The intensity of this illumination is dependent upon the energy discharge from the capacitors 16, 20 and 24.

Although three capacitors are shown in the enclosed drawing and described above, it will be appreciated that only two capacitors and one diode can be used without departing from the scope of the invention. It will also be appreciated that additional branches can be provided with each branch having a diode and a capacitor similar to that shown in the enclosed drawing and described above. It will also be appreciated that the charging and discharging circuit can be used with other equipment than flashtubes or cameras.

The switch 42 is included to discharge the capacitors 16, 20 and 24 when the apparatus constituting the invention is not being used. As will be appreciated, it is desirable to discharge the capacitors 16, 20 and 24 as a safety precaution when the apparatus constituting this invention is not being used.

Although this application has been disclosed and illustrated with reference to particular applications, the principles involved are susceptible of numerous other applications which will be apparent to persons skilled in the art. This invention is, therefore, to be limited only as indicated by the scope of the appended claims.

I claim:

1. The combination for providing a controlled discharge of energy,
    a plurality of capacitors,
    first means for providing for the introduction of electrical energy to the capacitors,
    a plurality of unidirectional members each connected in a series branch with an individual one of the capacitors and each series branch forming a parallel branch with a different one of the capacitors, each of the unidirectional members being connected to provide for the introduction of electrical energy by the first means to the capacitors,
    a multi-position switch having a series of contacts each individually connected to a different one of the capacitors in the plurality to provide for the progressive addition of at least one capacitor to the total number of capacitors capable of being discharged through the preceding contact in the series, and
    means for receiving the discharge of the electrical energy from the capacitors.

2. The combination set forth in claim 1 for operation by a camera,
    the receiving means constituting a flashtube, and
    means including an additional capacitor and an additional switch connected to the flashtube to trigger the flashtube for instituting the discharge of the capacitors.

3. In combination for providing a controlled discharge of energy,
    a plurality of capacitors,
    a plurality of unidirectional members each connected in series with an individual one of the capacitors each series combination is connected in the plurality and in parallel with a preceding capacitor in the plurality, each of the unidirectional members being connected to its series in a direction providing for the charging of its series capacitor,
    a switch having a movable contact and a plurality of stationary contacts each connected to a different one of the unidirectional members and its series capacitor, the switch being operative in each position of the movable contact to provide for the discharge of the capacitor associated with the activated stationary contact and the discharge of the preceding capacitors in the plurality,
    means for providing for the charging of the capacitors in the plurality, and
    means for receiving the energy discharged by the capacitors.

4. The combination set forth in claim 3 operable by a camera and including:
    the receiving means including a flashtube, and
    means including an additional capacitor and an additional switch connected to the flashtube to trigger the flashtube for instituting the discharge of the capacitor in accordance with the operation of the additional switch.

5. In combination for providing a controlled discharge of energy,
    switching means having a plurality of operative relationships,
    a plurality of unidirectional means each having a relatively low impedance in a forward direction and a relatively high impedance in a reverse direction,
    means for providing electrical energy,
    a plurality of capacitors each connected in series with the energy-providing means, a particular different one of the unidirectional means and all the preceding unidirectional means in the plurality to provide a low impedance from the energy-providing means to the series capacitor for a charging of the series capacitor, each capacitor and particular unidirectional member in series being connected in parallel with the preceding capacitor in the plurality,
    the switching means being connected to the capacitors and the unidirectional members to provide for a discharge of an individual number of capacitors in the plurality in each of the operative relationships in the plurality, and
    means for receiving the energy discharged from the capacitors.

6. The combination set forth in claim 5 operable by a camera,
    the receiving means including a flashtube,
    an additional capacitor, and
    switching means operative to provide a discharge of the additional capacitor through the switch to trigger the flashtube for discharge of the capacitors in the plurality through the flashtube.

7. In combination for providing a controlled discharge of energy,
    at least a pair of energy-storage members,
    at least one unidirectional member having a relatively low impedance in a forward direction and a relatively high impedance in a reverse direction, the unidirectional member being connected to series with a first one of the energy-storage members across the other one of the energy-storage members, the unidirectional member being connected to the forward direction to the first energy-storage member to provide for the storage of energy in the first energy-storage member,
    means connected to the other energy-storage member to provide for a storage of energy in the first and the other energy-storage members,
    a switch having first and second operative relationships and operative in the first relationship to provide for the discharge of the energy in the other storage member and to inhibit the discharge of the energy in the first storage member by the operation of the unidirectional member in the reverse direction, the switching means being operative in the second relationship to provide for the discharge of the energy in the first and the other capacitors by the operation of the unidirectional member in the forward direction, and
    means for receiving the energy discharged by the first and second energy-storate means.

8. The combination set forth in claim 7 wherein the energy storage means are capacitors and the switch has a pair of stationary contacts individually connected to the first and the other capacitors and has a movable contact connected to the receiving means.

9. The combination set forth in claim 7 for operation by, in conjunction with the operation of the camera, a camera,
    the receiving means including a flashtube capacitor,
    an additional capacitor, and
    switching means operative to provide a discharge of the additional capacitor through the flashtube for obtaining a discharge of the capacitors in the plurality through the flashtube.

10. In combination for providing a controlled discharge of energy:
    first means providing a source of operating potential;
    second means providing a reference potential;
    a plurality of unidirectional members connected in a series relationship and having properties of passing current in one direction and inhibiting the flow of current in the opposite direction,
    said series of unidirectional members connected to said first means in a current-passing direction and having a plurality of terminals each disposed between each successive pair of said unidirectional members;

a plurality of third means for receiving the operating potential from and for storing a charge in accordance with said operating potential by said first means, each of said third means being connected between a different one of said terminals and the reference potential;

a load;

fourth means for switching said third means through the load, said fourth means having a movable terminal and a plurality of stationary terminals an individual one of which is in contact with said movable terminal, in accordance with the movement of the movable terminal each of said stationary terminals being in contact with an individual one of said terminals between the successive pairs of unidirectional members;

said fourth means being operable to discharge through the load the particular third means which is in contact with said movable terminal through the unidirectional members oriented in the current-passing direction.

11. The combination as defined in claim 10 for controlling the operation of a camera flash unit, said load comprising:

a flashtube connected between said movable terminal and said reference potential; and fifth means connected between said first means and said flashtube for triggering said flashtube thereby enabling the discharge of at least one of said third means through said flashtube.

12. A combination for providing a controlled discharge of energy comprising:

first means for providing a source of electrical potential, said first means having first and second terminals for providing the electrical potential between said terminals;

a multi-position switch having a plurality of stationary contacts and a movable contact connected to an individual of said stationary contacts dependent upon the movement of the movable contact, a first one of said stationary contacts being connected to the first terminal of said first means;

a plurality of energy-storing devices having properties of being charged by said first means, a different one of said energy-storing devices being connected between each individual one of said stationary contacts and the second terminal of said first means;

a plurality of unidirectional members each having a relatively low impedance in a forward direction and a relatively high impedance in a reverse direction, a different one of said unidirectional members connected to an individual one of said stationary contacts in a forward direction from a first one of said stationary contacts;

a load connected between the movable contact of said switch and the second terminal of said first means;

said energy-storage devices being simultaneously charged by said first means and each being discharged when the movable contact is connected to its associated stationary contact or any stationary contact displaced in the forward direction from the associated stationary contact.

13. The combination as defined in claim 12 for controlling the operation of a camera flash unit, said load comprising:

a flashtube connected between said movable contact and the second terminal of said first means; and second means connected between said first means and said flashtube for triggering said flashtube thereby enabling the discharge of a number of said energy-storing devices through said flashtube in accordance with the positioning of the movable contact.

* * * * *